United States Patent
Zhu et al.

(10) Patent No.: US 9,843,367 B2
(45) Date of Patent: *Dec. 12, 2017

(54) ENHANCED NODE B AND METHOD FOR PRECODING WITH REDUCED QUANTIZATION ERROR

(71) Applicant: Intel Corporation, Santa Clara, CA (US)

(72) Inventors: Yuan Zhu, Beijing (CN); Qinghua Li, San Ramon, CA (US); Xiaogang Chen, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/373,366

(22) Filed: Dec. 8, 2016

(65) Prior Publication Data

US 2017/0155435 A1    Jun. 1, 2017

Related U.S. Application Data

(63) Continuation of application No. 14/887,499, filed on Oct. 20, 2015, now Pat. No. 9,525,471, which is a (Continued)

(51) Int. Cl.
*H04B 7/04* (2017.01)
*H04B 7/06* (2006.01)
(Continued)

(52) U.S. Cl.
CPC ......... *H04B 7/0456* (2013.01); *H04B 7/0639* (2013.01); *H04W 24/10* (2013.01); *H04W 72/06* (2013.01); *H04B 7/0452* (2013.01)

(58) Field of Classification Search
CPC .... H04B 7/024; H04B 7/0413; H04B 7/0452; H04B 7/0456; H04B 7/0482; (Continued)

(56) References Cited

U.S. PATENT DOCUMENTS 8,644,289 B2    2/2014  Zhu et al.
9,197,372 B2   11/2015  Zhu et al.
(Continued)

FOREIGN PATENT DOCUMENTS

CN   101641894 A   2/2010
CN   103444115 A   12/2013
(Continued)

OTHER PUBLICATIONS

"U.S. Appl. No. 13/075,320 , Response filed Feb. 5, 2013 to Non Final Office Action dated Dec. 4, 2012", 13 pgs.
(Continued)

*Primary Examiner* — Young T Tse
(74) *Attorney, Agent, or Firm* — Schwegman Lundberg & Woessner, P.A.

(57) ABSTRACT

Embodiments of an enhanced Node B (eNB) and method for precoding with reduced quantization error are generally described herein. In some embodiments, first and second precoding-matrix indicator (PMI) reports may be received on an uplink channel and a single subband precoder matrix may be interpolated from precoding matrices indicated by both the PMI reports. Symbols for multiple-input multiple output (MIMO) beamforming may be precoded using the interpolated precoder matrix computed for single subband for a multiple user (MU)-MIMO downlink orthogonal frequency division multiple access (OFDMA) transmission. In some embodiments, each of the first and second PMI reports includes a PMI associated with a same subband that jointly describes a recommended precoder.

19 Claims, 8 Drawing Sheets

Related U.S. Application Data continuation of application No. 14/160,931, filed on Jan. 22, 2014, now Pat. No. 9,197,372, which is a continuation of application No. 13/075,320, filed on Mar. 30, 2011, now Pat. No. 8,644,289.

(60) Provisional application No. 61/410,740, filed on Nov. 5, 2010.

(51) Int. Cl.
  *H04W 24/10* (2009.01)
  *H04W 72/06* (2009.01)
  *H04B 7/0456* (2017.01)
  *H04B 7/0452* (2017.01)

(58) Field of Classification Search
  CPC .. H04B 7/0617; H04B 7/0639; H04B 7/0652; H04L 1/009; H04L 1/20; H04L 5/0048; H04L 2001/0093; H04L 2001/0097; H04W 24/10; H04W 40/24; H04W 52/0209; H04W 52/146; H04W 52/34; H04W 52/365; H04W 72/042; Y02B 60/50
  USPC .............. 375/219, 220, 260, 262, 265, 267; 370/224, 254, 344
  See application file for complete search history.

(56) References Cited

U.S. PATENT DOCUMENTS

| | | |
|---|---|---|
| 9,525,471 B2 | 12/2016 | Zhu et al. |
| 2008/0232492 A1 | 9/2008 | Xiao et al. |
| 2009/0046569 A1 | 2/2009 | Chen et al. |
| 2009/0190528 A1* | 7/2009 | Chung .................. H04B 7/0417 370/328 |
| 2010/0002664 A1 | 1/2010 | Pan et al. |
| 2010/0074316 A1 | 3/2010 | Kim et al. |
| 2010/0074356 A1 | 3/2010 | Ashikhmin |
| 2010/0091893 A1 | 4/2010 | Gorokhov |
| 2010/0098012 A1* | 4/2010 | Bala .................... H04L 5/001 370/329 |
| 2010/0239036 A1 | 9/2010 | Koo et al. |
| 2010/0322176 A1 | 12/2010 | Chen et al. |
| 2011/0134771 A1 | 6/2011 | Chen et al. |
| 2011/0200081 A1 | 8/2011 | Guo et al. |
| 2012/0076028 A1* | 3/2012 | Ko ....................... H04L 1/0026 370/252 |
| 2012/0088533 A1* | 4/2012 | Khoshnevis .......... H04L 1/0026 455/509 |
| 2012/0113830 A1 | 5/2012 | Zhu et al. |
| 2012/0140712 A1* | 6/2012 | Yamada .............. H04W 72/042 370/329 |
| 2012/0188976 A1 | 7/2012 | Kim et al. |
| 2012/0320783 A1 | 12/2012 | Wu et al. |
| 2012/0320862 A1 | 12/2012 | Ko et al. |
| 2014/0133445 A1 | 5/2014 | Zhu et al. |
| 2016/0094283 A1 | 3/2016 | Zhu et al. |

FOREIGN PATENT DOCUMENTS

| | | |
|---|---|---|
| CN | 106160818 A | 11/2016 |
| WO | WO-2012061605 A2 | 5/2012 |

OTHER PUBLICATIONS

"U.S. Appl. No. 13/075,320 , Response filed Aug. 21, 2013 to Final Office Action dated May 22, 2013", 11 pgs.
"U.S. Appl. No. 13/075,320, Final Office Action dated 05-22-13", 29 pgs.
"U.S. Appl. No. 13/075,320, Non Final Office Action dated Dec. 4, 2012", 26 pgs.
"U.S. Appl. No. 13/075,320, Notice of Allowance dated Sep. 17, 2013", 13 pgs.
"U.S. Appl. No. 13/075,320, PTO Response to 312 Amendment dated Dec. 10, 2013", 2 pgs.
"U.S. Appl. No. 14/160,931, Non Final Office Action dated Mar. 12, 2015", 17 pgs.
"U.S. Appl. No. 14/160,931, Notice of Allowance dated Jul. 13, 2015", 7 pgs.
"U.S. Appl. No. 14/160,931, Preliminary Amendment filed Jan. 23, 2014", 9 pgs.
"U.S. Appl. No. 14/160,931, Response filed Jun. 12, 2015 to Non Final Office Action dated Mar. 12, 2015", 13 pgs.
"U.S. Appl. No. 14/887,499, Non Final Office Action dated Apr. 22, 2016", 10 pgs.
"U.S. Appl. No. 14/887,499, Notice of Allowance dated Aug. 11, 2016", 10 pgs.
"U.S. Appl. No. 14/887,499, Preliminary Amendment filed Dec. 14, 2015", 7 pgs.
"U.S. Appl. No. 14/887,499, Response filed Jul. 15, 2016 to Non Final Office Action dated Apr. 22, 2015", 11 pgs.
"Chinese Application Serial No. 201180064384.8, Office Action dated Apr. 29, 2016", W/ Machine Translation, 8 pgs.
"Chinese Application Serial No. 201180064384.8, Office Action dated Aug. 5, 2015", W/ English Translation, 10 pgs.
"Chinese Application Serial No. 201180064384.8, Office Action dated Oct. 19, 2016", W/ English Translation, 8 pgs.
"Chinese Application Serial No. 201180064384.8, Response filed Jan. 19, 2016 to Office Action dated Aug. 5, 2015", W/ English Claims, 16 pgs.
"Chinese Application Serial No. 201180064384.8, Response filed Jul. 14, 2016 to Office Action dated Apr. 29, 2016", W/ English Translation of Claims, 26 pgs.
"International Application Serial No. PCT/US2011/059164, International Preliminary Report on Patentability dated May 16, 2013", 6 pgs.
"International Application Serial No. PCT/US2011/059164, International Search report dated May 30, 2012", 3 pgs.
"International Application Serial No. PCT/US2011/059164, Written Opinion dated May 30, 2012", 4 pgs.
Khaled, Nadia, et al., "Interpolation-Based Multi-Mode Precoding for MIMO-OFDM Systems with Limited Feedback", IEEE Transactions on Wireless Communications, 6(3), (Mar. 2007), 1003-1013.
Li, Qinghua, et al., "MIMO techniques in WiMAX and LTE: a feature overview", IEEE Communications Magazine, 48(5).
"Chinese Application Serial No. 201180064384.8, Response filed Dec. 6, 2016 to Office Action dated Oct. 19, 2016", W/English Translation of Claims, 12 pgs.
"Chinese Application Serial No. 201610802578.8, Voluntary Amendment filed Feb. 22, 2017", w/ Claims in English, 10 pgs.

* cited by examiner

PUCCH 2-1 EXTENSION FOR AN 8Tx ANTENNA CONFIGURATION

PUCCH 3-2 FOR 8Tx ANTENNA

FIG. 6A

STRAIGHT FORWARD PUCCH 3-2 FOR 4Tx ANTENNA

FIG. 6B

ENHANCED PUCCH 3-2 SUBBAND PRECODER CALCULATION WITH ONE ADDITIONAL WB $W_2$ PMI

FIG. 6C

| SB $W_2$, CQI$^2$ | SB $W_2$, CQI$^2$ | SB $W_2$, CQI$^2$ | SB $W_2$, CQI$^2$ | SB $W_2$, CQI$^2$ | SB $W_2$, CQI$^2$ | SB $W_2$, CQI$^2$ | SB $W_2$, CQI$^2$ | SB $W_2$, CQI$^2$ |
|---|---|---|---|---|---|---|---|---|
| WB $W_2$ | | | | | | | | |

FREQUENCY →

| $SB_0$ | $SB_1$ | $SB_2$ | $SB_3$ | $SB_4$ | $SB_5$ | $SB_6$ | $SB_7$ | $SB_8$ |

PUCCH 3-2 FOR 4Tx ANTENNA WITH WIDEBAND $W_2$ PMI

FIG. 6D

| SB CQI | SB CQI | SB CQI | SB CQI | SB CQI | SB CQI | SB CQI | SB CQI | SB CQI |
|---|---|---|---|---|---|---|---|---|
| TWO_SB $W_2$ || TWO_SB $W_2$ || TWO_SB $W_2$ || TWO_SB $W_2$ || SB $W_2$ |
| WB $W_2$ |||||||||

FREQUENCY →

| $SB_0$ | $SB_1$ | $SB_2$ | $SB_3$ | $SB_4$ | $SB_5$ | $SB_6$ | $SB_7$ | $SB_8$ |
|---|---|---|---|---|---|---|---|---|

PUCCH 3-2 FOR 4Tx ANTENNA WITH WIDEBAND $W_2$ PMI AND ONE SUBBAND $W_2$ PMI FOR TWO SBs

*FIG. 6E*

| SB CQI | SB CQI | SB CQI | SB CQI | SB CQI | SB CQI | SB CQI | SB CQI | SB CQI |
|---|---|---|---|---|---|---|---|---|
| FIRST SB $W_2$ || FIRST SB $W_2$ || FIRST SB $W_2$ || FIRST SB $W_2$ || FIRST SB $W_2$ |
| SECOND SB $W_2$ || SECOND SB $W_2$ || SECOND SB $W_2$ || SECOND SB $W_2$ || SECOND SB $W_2$ |

FREQUENCY →

| $SB_0$ | $SB_1$ | $SB_2$ | $SB_3$ | $SB_4$ | $SB_5$ | $SB_6$ | $SB_7$ | $SB_8$ |
|---|---|---|---|---|---|---|---|---|

PUCCH 3-2 FOR 4Tx ANTENNA WITH TWO SUBBAND $W_2$ PMI FOR TWO SBs

*FIG. 6F*

| SB CQI | SB CQI | SB CQI | SB CQI | SB CQI | SB CQI | SB CQI | SB CQI | SB CQI |
|---|---|---|---|---|---|---|---|---|
| FIRST SB $W_2$ || FIRST SB $W_2$ || FIRST SB $W_2$ || FIRST SB $W_2$ || FIRST SB $W_2$ |
| SECOND SB $W_2$ | SECOND SB $W_2$ | SECOND SB $W_2$ | SECOND SB $W_2$ | SECOND SB $W_2$ | SECOND SB $W_2$ | SECOND SB $W_2$ | SECOND SB $W_2$ | SECOND SB $W_2$ |

FREQUENCY →

| $SB_0$ | $SB_1$ | $SB_2$ | $SB_3$ | $SB_4$ | $SB_5$ | $SB_6$ | $SB_7$ | $SB_8$ |
|---|---|---|---|---|---|---|---|---|

PUCCH 3-2 FOR 4Tx ANTENNA WITH ONE SUBBAND $W_2$ PMI PLUS TWO SUBBAND $W_2$ PMI FOR TWO SBs

*FIG. 6G*

ENHANCED NODE B AND METHOD FOR PRECODING WITH REDUCED QUANTIZATION ERROR

PRIORITY CLAIM

This application is a continuation of U.S. patent application Ser. No. 14/887,499, filed on Oct. 20, 2015, now issued as U.S. Pat. No. 9,525,471, which is a continuation of U.S. patent application Ser. No. 14/160,931, filed on Jan. 22, 2014, now issued as U.S. Pat. No. 9,197,372, which is a continuation of U.S. patent application Ser. No. 13/075,320, filed on Mar. 30, 2011, now issued as U.S. Pat. No. 8,644,289, which claims priority under 35 U.S.C. 119(e) to U.S. Provisional Patent Application Ser. No. 61/410,740, filed Nov. 5, 2010, all of which are incorporated herein by reference in their entireties.

TECHNICAL FIELD

Embodiments pertain to wireless communications. Some embodiments relate to codebook interpolation to reduce quantization error for closed-loop multi-user multiple-input multiple output (MU-MIMO). Some embodiments relate to codebook interpolation for the various reporting modes of the physical uplink control channel (PUCCH) and the physical uplink shared channel (PUSCH) of the Evolved Universal Terrestrial Radio Access Network (E-UTRAN), known as the Long Term Evolution and referred to as LTE.

Some embodiments relate to codebook interpolation for the LTE PUCCH configured for reporting mode 2-1 extension, and other embodiments relate to codebook interpolation for the PUSCH configured for reporting modes 3-1 and 3-2 of LTE release 10 (known as LTE advanced).

BACKGROUND

Fourth-Generation (4G) communication systems, such as LTE networks, use closed-loop beamforming techniques to improve throughput. In these systems, a receiver feeds back, among other things, precoding information, to a transmitter that recommends a precoder for use in transmitting beamformed signals back to the receiver. Since the selection of precoders is limited to particular codebooks, the recommended precoder may not be ideal based on the current channel conditions. MU-MIMO transmissions are particularly sensitive to this quantization error for a given codebook. Although this quantization error may be reduced through the use of a larger codebook, recommending a precoder associated with a larger codebook would require significant additional feedback as well as defining a larger codebook.

Thus, what are needed are systems and methods for precoding that reduce quantization error without the use of larger codebook. What are also needed are systems and methods for precoding that reduce quantization error suitable for MU-MIMO in LTE networks.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
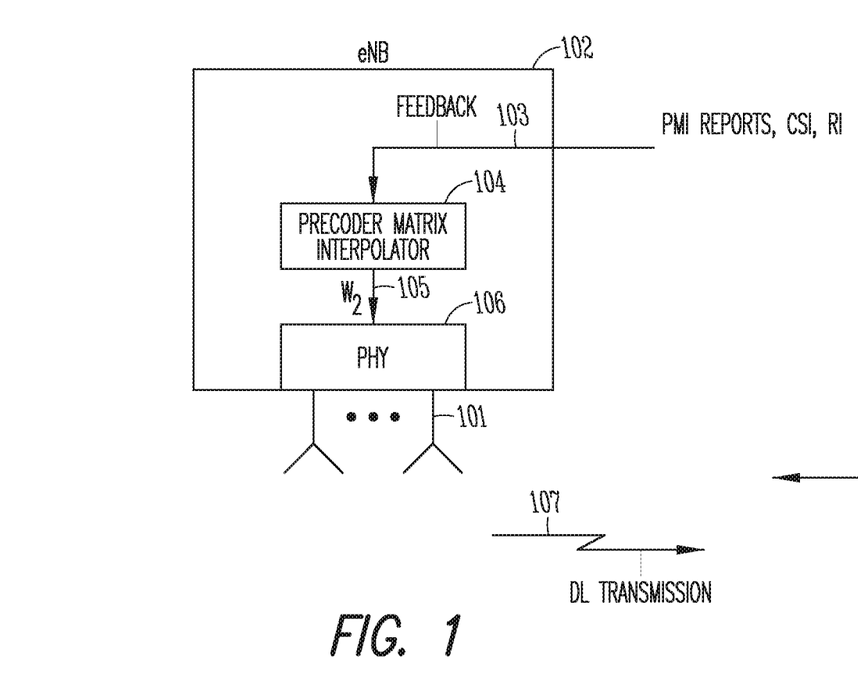
FIG. 1 is a functional diagram of enhanced node-B (eNB) in accordance with some embodiments.

FIG. 1 is a functional diagram of enhanced node-B (eNB) in accordance with some embodiments. The eNB 102 may be configured to receive first and second precoding-matrix indicator (PMI) reports 103 on an uplink channel from user equipment (UE), and compute a single subband precoder matrix ($W_2$) 105 from both the PMI reports 103. The eNB 102 may also be configured to precode symbols for MIMO beamforming using the computed single subband precoder matrix 105 for downlink transmission to the UE within a subband. Each of the first and second PMI reports 103 includes a PMI associated with a same subband (SB). The first PMI report may include a first subband PMI and the second PMI report may include a second subband PMI. In these embodiments, the use of two PMIs associated with the same subband may help reduce quantization error without having to define a new codebook. These embodiments are described in more detail below.

As illustrated in FIG. 1, the eNB 102 may include, among other things, a precoder matrix interpolator 104 to generate an interpolated precoding matrix corresponding to the single subband precoder matrix 105 computed from the PMIs in both the PMI reports 103. The eNB 102 may also include physical layer (PHY) circuitry 106 to precode symbols for beamforming for the downlink transmission 107. The eNB 102 may also include two or more antennas 101 for MIMO as well as MU-MIMO communications. In some embodiments, the MIMO transmission may be transmission on a physical downlink shared channel (PDSCH).

Figure 2:
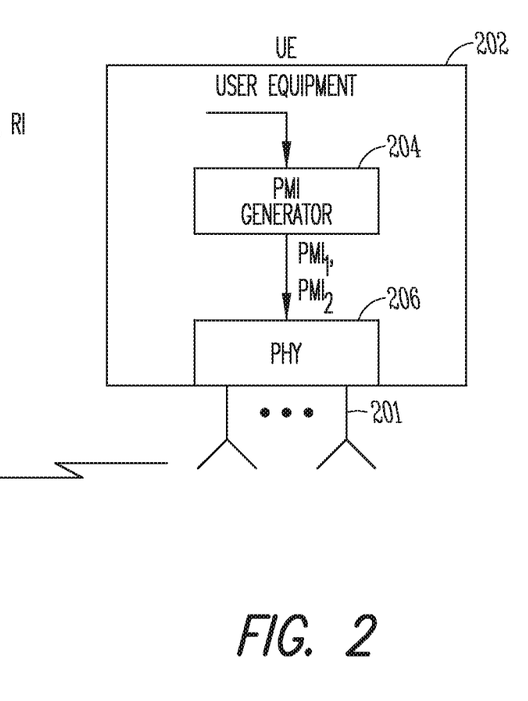
FIG. 2 is a functional block diagram of user equipment (UE) in accordance with some embodiments.

FIG. 2 is a functional block diagram of user equipment (UE) in accordance with some embodiments. The UE 202 may include a PMI generator 204 configured to select the first and second PMIs based on channel conditions within a particular subband, and physical-layer circuitry (PHY) 206 to transmit the PMI reports 103 (FIG. 1) to the eNB 102 (FIG. 1). Each PMI in the PMI reports 103 may be associated with a precoder matrix. The UE 202 may also include two or more antennas 201 for MIMO communications as well as for the receipt of MU-MIMO communications.

In accordance with some embodiments, the second subband PMI is selected by the UE 202 after selecting the first subband PMI by searching candidate precoder matrices that, when combined with a precoder matrix indicated by the first subband PMI, result in a more accurate precoder for the subband. In other words, the use of the computed single subband precoder matrix 105 by the eNB 102 results in a more accurate precoder for the subband than the precoder resulting from use of precoder matrix indicated by the first subband PMI by itself. In some embodiments, the UE may generate candidate single interpolated subband precoder matrices by combining the first precoder matrix with candidate second precoder matrixes to identify a selected second precoder matrix that when combined with the first precoder matrix results in a single interpolated subband precoder matrix that provides a maximum reduction in quantization error when used by the eNB 102 for precoding transmissions to the UE.

A subband may be one resource block (RB) that comprises a set of subcarriers (e.g., twelve subcarriers), although this is not a requirement. In some embodiments, the first subband PMI and the second subband PMI may both be selected by the UE 202 from a table depending on the transmission rank.

In some embodiments, the UE 202 selects a first precoder matrix for the first subband PMI from a set of precoder matrices defined by a codebook to maximize throughput based on a channel transfer function associated with the subband. The UE 202 selects a second precoder matrix for the second subband PMI so that the interpolated precoder matrix computed from both the first subband PMI and the second subband PMI reduces quantization error that would result from use of the precoder matrix indicated by the first subband PMI alone.

In these embodiments, single subband precoder matrix that is computed from both the first subband PMI and the second subband PMI is a recommended precoding matrix (i.e., recommended by the UE 202 to the eNB 102). Although the precoder matrix indicated by the first subband PMI may be selected to maximize throughput, the use of this precoder matrix may result in a quantization error that may be large depending on the differences between an optimum precoder and the precoder associated with the first subband PMI.

Figure 3:
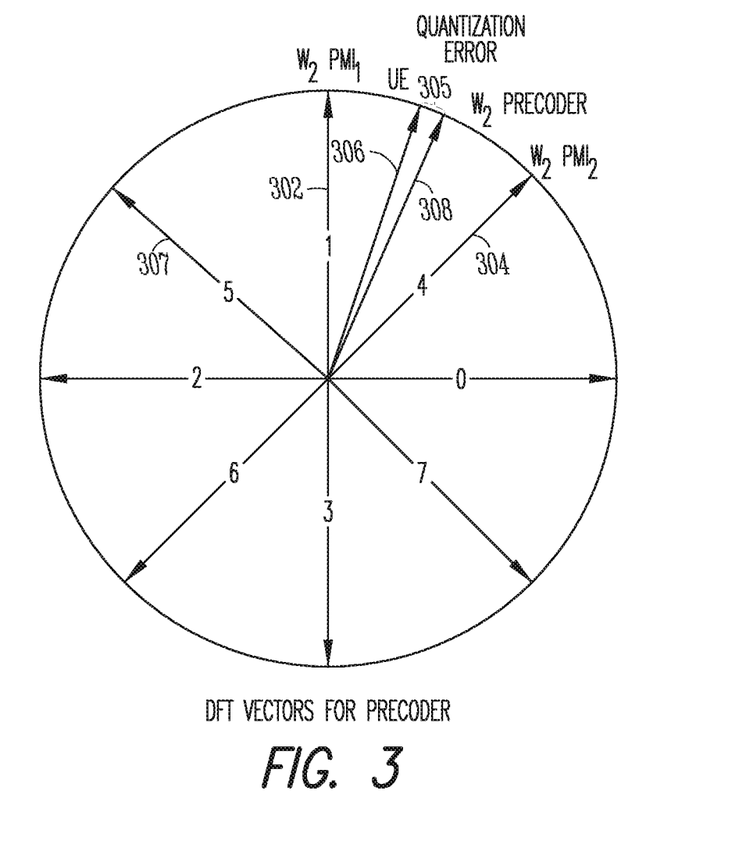
FIG. 3 illustrates Discrete Fourier Transform (DFT) vectors associated with precoding matrices in accordance with some embodiments.

FIG. 3 illustrates Discrete Fourier Transform (DFT) vectors associated with precoding matrices in accordance with some embodiments. As illustrated in FIG. 3, DFT vector 306 may be associated with an optimum precoder for the subband and DFT vector 302 may be associated with the precoder associated with the first subband PMI ($W_2$). The difference between DFT vectors 302 and 306 may correspond to the quantization error that would result without the use of the second subband PMI. DFT vector 304 may be associated with the second subband PMI, and DFT vector 308 may be associated with the interpolated single subband precoder matrix computed from both the first subband PMI and the second subband PMI. As a result, the quantization error may be reduced to the difference between DFT vectors 306 and 308, resulting in reduced quantization error 305.

In some embodiments, the first PMI report includes a subband PMI, and the second PMI report includes a subband differential PMI. The subband PMI may be an index corresponding to a recommended precoder based on channel characteristics of the subband. The subband differential PMI may be an index to indicate a difference between the recommended precoder and channel characteristics of the subband. In these embodiments, the subband differential PMI may be based on a quantization error related to a difference between a DFT vector associated with the subband PMI and channel characteristics of the subband.

In some embodiments, the first PMI report includes a first subband PMI and the second PMI report includes a second subband PMI. The first and second subband PMIs may be selected by the UE 202 to jointly describe the same subband of the channel. The first subband PMI and the second subband PMI correspond to precoding matrices selected by the UE 202 from a same codebook.

In some embodiments, the first and second PMI reports 103 are received from the UE 202 by the eNB 102 on a physical uplink control channel (PUCCH) within either a same subband-report subframe or a different subband-report subframe. In these embodiments, the PUCCH may be configured in accordance with 3GPP TS 36.213 V10.0 (referred to as LTE release 10). Depending on the PUCCH format being used, the first and second PMI reports 103 may be received in the same subband-report subframe or a different subband-report subframe. In some other embodiments, the first and second PMI reports 103 may be received on a physical uplink shared channel (PUSCH).

In some embodiments, the first PMI report may be a wideband PMI report and the second PMI report is a subband PMI report. In these embodiments, the wideband PMI report and the subband PMI report may correspond to the wideband PMI report and the subband PMI report as defined in LTE release 10; however, both the wideband PMI report and the subband PMI report in accordance with some embodiments of the present invention include a PMI describing the same subband. In these embodiments, both of the PMIs relate to the same subband and may be used by the eNB 102 to determine an interpolated precoder matrix for a single subband.

In some embodiments, the codebook used by the UE 202 for selecting both the first and second subband PMIs is a four transmit (4TX) antenna codebook, and the first and second PMI reports 103 are reported in accordance with an eight transmit (8TX) antenna reporting mode (e.g., for PUCCH 2-1). In these embodiments, the 4TX codebook may be the 4TX codebook of LTE release 8 and the first and second PMI reports 103 may be reported in accordance with the 8TX codebook of LTE release 10 on the PUCCH in format 2-1 (i.e., PUCCH 2-1).

In some embodiments, the single subband precoder matrix (i.e., the interpolated precoding matrix) may be computed by performing an interpolation on corresponding vectors of precoder matrices indicated by the first subband PMI and the second subband PMI. The interpolation may include weighting and combining the corresponding vectors of the precoder matrices to generate an interpolated precoding matrix.

In some embodiments, the precoder matrices indicated by the first subband PMI and the second subband PMI are weighted equally. In other embodiments, the precoder matrices indicated by the first subband PMI and the second subband PMI may be weighted different. The interpolation procedure and the weighting may be predetermined and known by both the UE 202 and the eNB 102. In some embodiments, the weighting may be indicated by the UE 202 and reported along with the first and second PMI reports 103.

In some embodiments, the first subband PMI and the second subband PMI correspond to precoding matrices selected from the same codebook. The codebook may consist of a number of DFT vectors and a number of non-DFT vectors, such as those illustrated in FIG. 3. When both the first and second PMIs indicate DFT vectors, the DFT phase of the interpolated precoding matrix is generated from a weighted average of the DFT phases of the DFT vectors. On the other hand, when either the first or the second PMI does not indicate a DFT vector, each element of the vectors of the interpolated precoding matrix is generated from a weighted average of phases of corresponding elements of the DFT vectors.

In these embodiments, when both the first and second PMIs indicate DFT vectors, vectors of the interpolated precoding matrix may comprise DFT vectors. When either the first and second PMIs do not indicate a DFT vector, the vectors of the interpolated precoding matrix are not necessarily DFT vectors.

In these embodiments, when both the first and second PMIs indicate DFT vectors, each DFT vector can be uniquely defined by one phase. The phase of the interpolated DFT vector is a weighted average of the two phases of the two DFT vectors indicated by the first and second subband PMIs.

On the other hand, for a transmission of rank one, if any precoder vector associated with the first and second PMIs is not a DFT vector, then each element of the interpolated precoder is generated from a weighted average of the phases of the same element of both precoders. When both of the PMIs do not indicate DFT vectors (i.e., either PMI may indicate a non-DFT vector), each element of the interpolated precoder will be a weighted average of the phases of the same element of both precoding matrices (i.e., the precoding matrices indicated by the first and second subband PMIs).

For a transmission of rank two, the first column of the interpolated precoder will be interpolated using the first column of two precoders. The second column of the interpolated precoder is partially interpolated from the second column of the two precoders and partially calculated to ensure the two columns of the interpolated precoder are orthogonal to each other. A transmission of rank two may be a two-layer transmission on two antenna ports. A transmission of rank two may use a precoding matrix having two precoding vectors. A transmission of rank one, on the other hand, may be a single layer transmission on a single antenna port and may use a precoding matrix having a single precoding vector. These embodiments are discussed in more detail below.

In some embodiments, the precoding performed by the eNB 102 may comprise multiplying symbols by the interpolated precoding matrix (i.e., the single subband precoder matrix 105) to generate an orthogonal frequency division multiple access (OFDMA) transmission. In MU-MIMO embodiments, the OFDMA transmission may be precoded for transmission to a plurality of UEs using the computed single subband precoder matrix generated by interpolation for each UE. In these embodiments, each UE may recommend an interpolated precoder matrix with first and second PMI reports that relate to a single subband.

Although embodiments are described herein in which the UE 202 generates the first and second PMI reports 103 for transmission to the eNB 102 to allow the eNB 102 to precode signals for transmission, the scope of the embodiments is not limited in this respect. In other embodiments, the eNB 102 may generate first and second PMI reports 103 for transmission to the UE 202 to allow the UE 202 to precode signals for transmission to the eNB 102.

In some embodiments in which the PUSCH is configured for reporting mode 3-2 (PUSCH 3-2), two PMI reports may be provided for every two consecutive subbands of a plurality of N subbands. In these embodiments, a single precoding matrix for each subband may be generated by interpolating the precoding matrices indicated by the two PMIs for each subband. In some of these PUSCH 3-2 embodiments, one wideband PMI may be provided for every N subbands and one subband PMI may be provided for each subband. The single precoding matrix may be computed for each subband based on the wideband PMI and the subband PMI for the associated subband. Various PUSCH 3-2 embodiments are discussed in more detail below.

Figure 4:
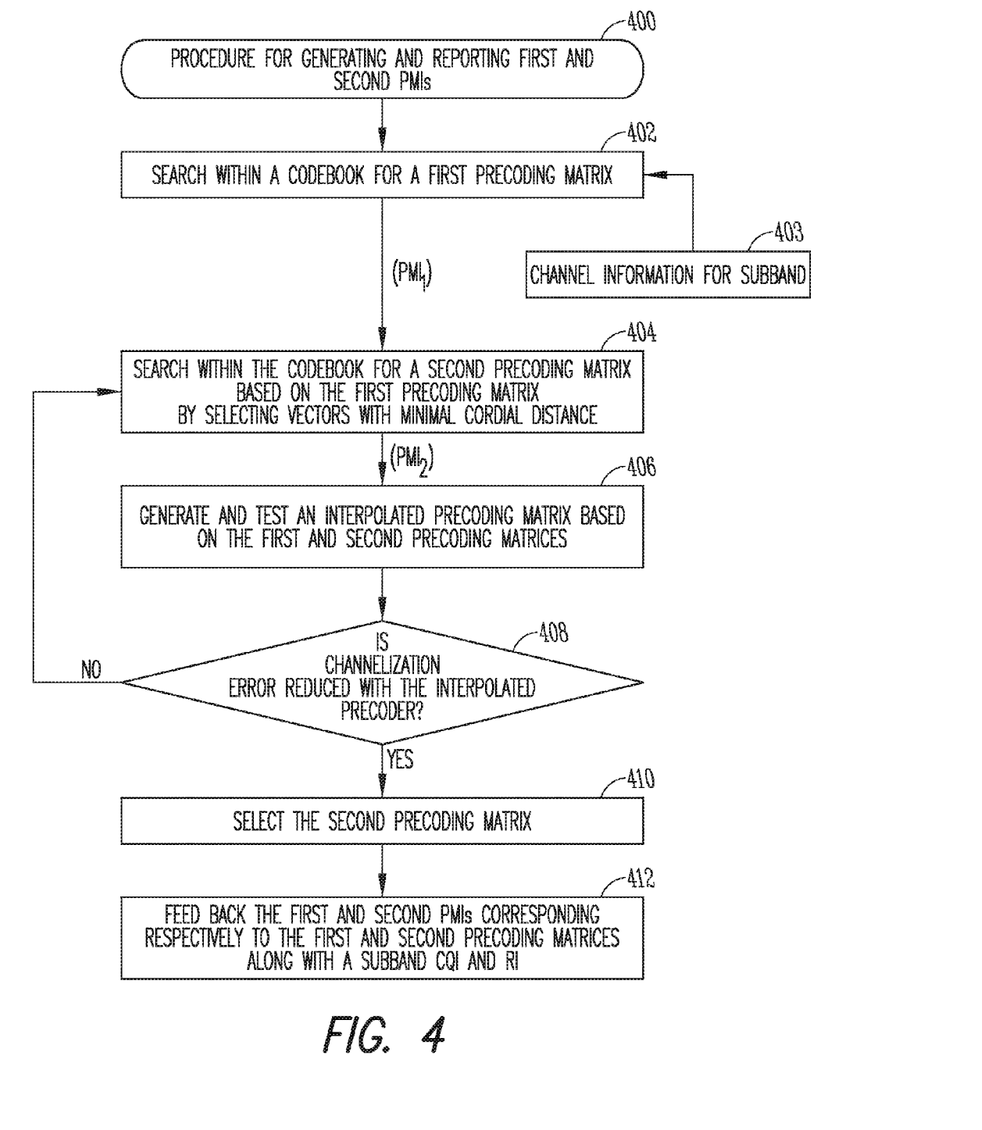
FIG. 4 is a flow chart of a procedure for generating and reporting first and second precoding matrix indicators (PMIs) in accordance with some embodiments.

FIG. 4 is a flow chart of a procedure for generating and reporting first and second PMIs in accordance with some embodiments. Procedure 400 may be performed by a receiver (e.g., UE 202 (FIG. 2)) that is configured to generate first and second PMIs 103 (FIG. 1) for transmission to a transmitter (e.g., eNB 102 (FIG. 1)).

In operation 402, a first codebook search may be performed based on channel information for the subband 403. The codebook search may result in a first precoding matrix that maximizes throughput.

In operation 404, a second codebook search may be performed based on the first precoding matrix selected in operation 402 to identify a second precoding matrix. The second codebook search may use the same codebook as the first codebook search and may select vectors with minimal chordal distances.

In operation 406, an interpolated precoding matrix is generated from the first and second precoding matrices. The interpolated precoding matrix is tested to determine if channelization error is reduced, compared with use of the precoding matrix associated with the first precoding matrix.

Operation 408 determines if the channelization error is reduced. When the channelization error is reduced, operation 410 is performed. When the channelization error is not reduced, operations 406 and 408 are repeated to identify a different second precoding matrix.

In operation 410, the second precoding matrix is selected.

In operation 412, first and second PMIs 103 associated respectfully with the first and second precoding matrices, along with a subband channel quality indicator (CQI) for the subband and a rank indicator (RI) (indicating the transmission rank) are fed back to the transmitter (e.g., the eNB 102).

In some embodiments, the codebook search of operations 402 and 404 for two $W_2$ PMIs can be very similar to that of one $W_2$ PMI in LTE release 8. In these embodiments, the UE 202 may first search for the best $W_2$ PMI i as the best precoding vector within the original 4Tx LTE release 8 codebook. After i is decided, the UE 202 may search j only in the matrices having minimum chordal distance with matrix i and test if the interpolated matrix will result in higher codebook search metrics. For example in FIG. 3, the best $W_2$ PMI i is DFT vector 302 (vector 1) after searching the LTE release 8 codebook. And after fixing i=1, the UE 202 may search two candidates of j (i.e., DFT vectors 304 (vector 4) and DFT vector 307 (vector 5)) and determine which of the resulting interpolated precoders for j=4 and j=5 will provide better metrics than DFT vector 302 alone. In this example, the UE 202 may determine that DFT vector 304 (j=4) will provide a better precoder than DFT vector 302 (i=1) alone. In this example, the UE 202 may feed back the first and second PMI reports 103 indicating $W_2$ PMI i=1 and $W_2$ PMI j=4. The subband CQI may be calculated conditioned on the interpolated precoder from $W_2$ PMI i=1 and $W_2$ PMI j=4.

In some embodiments, the interpolated precoder may be calculated as follows:

The first $W_2$ PMI may be i and the second $W_2$ PMI may be represented by j, then the precoder for PMI i and j are $v_i$ and $v_j$ respectively. For rank one, both $v_i$ and $v_j$ are 4×1 vectors. In the case when i equals to j, then the recommended $W_2$ precoder is $v_i$.

If both $v_i$ and $v_j$ are DFT vectors and i≠j, e.g. $v_i=0.5[1\ e^{j\theta_i}\ e^{j2\theta_i}\ e^{j3\theta_i}]^T$ and $v_j=0.5[1\ e^{j\theta_j}\ e^{j2\theta_j}\ e^{j3\theta_j}]T$, then the recommended $W_2$ precoder is $v_{W_2}=0.5\ [1\ e^{j(\theta_i+\theta_j)/2}\ e^{j(\theta_i+\theta_j)}\ e^{j3(\theta_i+\theta_j)/2}]^T$.

If any of the two precoding vectors are non-DFT vectors, e.g. $v_i = 0.5[1\ e^{j\alpha_1}\ e^{j\alpha_2}\ e^{j\alpha_3}]^T$ and $v_j = 0.5[1\ e^{j\beta_1}\ e^{j\beta_2}\ e^{j\beta_3}]^T$, then the recommended $W_2$ precoder is $$v_{W_2} = 0.5\left[1\ e^{j\frac{(\alpha_1+\beta_1)}{2}}\ e^{j\frac{(\alpha_2+\beta_2)}{2}}\ e^{j\frac{(\alpha_3+\beta_3)}{2}}\right]^T.$$

In accordance with some embodiments at least for rank one, an additional wideband rank one PMI may be used to report a second-best PMI, and the wideband precoder may be interpolated from two wideband PMI as described above. The subband CQI may be conditioned on the wideband precoder interpolated by both wideband rank one PMI.

Table 1 shows some example system level throughput gains for the PUSCH in extended reporting mode 3-1 with two wideband PMIs compared with the PUSCH mode 3-1. In these embodiments, the CQI calculation may be the same as described in LTE release 8.

TABLE 1

Mode 3-1 extension with two WB PMI compared with Mode 3-1

|  | high angular spread | | |
| --- | --- | --- | --- |
|  | Tx \|\|\|\| Rx \|\| | Tx XX Rx+ | Tx X X Rx+ |
| Cell SE gain | 8.6% | 2.8% | 1.6% |
| %5 SE gain | 16% | 6.5% | −2.6% |

Unlike PUSCH 3-1, PUSCH 3-2 transmissions may feedback one subband PMI per subband, allowing PUSCH 3-2 to address channels with greater delay spread. One issue is that PUSCH 3-2 may not provide enough throughput gain over PUSCH 3-1, particularly for a spatial-channel model (SCM) in an urban-macro-cell environment. Table 2 illustrates a comparison between PUSCH 3-1 and PUSCH 3-2.

TABLE 2

PUSCH Mode 3-2 compared with Mode 3-1

|  | high angular spread | | |
| --- | --- | --- | --- |
|  | Tx \|\|\|\| Rx \|\| | Tx XX Rx+ | Tx X X Rx+ |
| Cell SE gain | 1% | 2.8% | 3.5% |
| %5 SE gain | −0.2% | 5.3% | −0.1% |

In accordance with some embodiments, for every two consecutive subbands, two PMIs may be reported for two consecutive subbands and the precoders of two consecutive subbands may be interpolated from the two reported PMIs. The CQI calculation may be conditioned on the interpolated precoder. The overall signalling may be the same as the straight forward PUSCH 3-2.

Table 3 shows the throughput gain for these embodiments compared with the straight forward PUSCH 3-2.

TABLE 3

PUSCH Mode 3-2 extension with two PMIs for two subbands compared with PUSCH Mode 3-2

|  | high angular spread | | |
| --- | --- | --- | --- |
|  | Tx \|\|\|\| Rx \|\| | Tx XX Rx+ | Tx X X Rx+ |
| Cell SE gain | 9% | 3.5% | 0.2% |
| %5 SE gain | 7.8% | 0.9% | 14% |

As can be seen from table 3, compared with straight forward PUSCH 3-2, sending two PMIs for two subbands and using an interpolated precoder to calculate the CQI results in a significant throughput gain without an increase in the signaling overhead. For PUSCH 3-2, a reduction in subband PMI overhead may allow a modified PUSCH 3-2 (i.e., with less overhead) to be competitive with PUSCH 3-1.

In some embodiments, to reduce overhead half of subband PMIs may be sent with each subband PMI and may cover two consecutive subbands. Table 4 compares the performance in terms of spectrum efficiency (SE) with one PMI per subband for straight forward PUSCH 3-2.

TABLE 3

|  | high angular spread | | |
| --- | --- | --- | --- |
|  | Tx \|\|\|\| Rx \|\| | Tx XX Rx+ | Tx X X Rx+ |
| Cell SE gain | −0.3% | −0.9% | −0.7% |
| %5 SE gain | −3% | −0.2% | −0.4% |

Spectrum efficiency may be described in bits/s/Hz. For example if a one 10 MHz system bandwidth is able to deliver 10M bits in one second, the SE is 1 bit/s/Hz. As illustrated in table 4, sending one PMI for two consecutive subbands results in a marginal reduction in spectrum efficiency compared with one subband PMI per subband. Thus most of the gain in straight forward PUSCH 3-2 is retained.

In some alternate embodiments, one wideband PMI may be sent, and for each subband, a 2-bit differential subband PMI may be sent. The top four precoders having the smallest chordal distance to the wideband PMI may be listed by the 2 bits of the differential subband PMI. The precoder for each subband may be interpolated by the wideband PMI and the subband PMI. Table 5 shows one wideband PMI plus two differential PMIs per subband compared with one subband PMI for two consecutive subbands.

TABLE 5

|  | high angular spread | | |
| --- | --- | --- | --- |
|  | Tx \|\|\|\| Rx \|\| | Tx XX Rx+ | Tx X X Rx+ |
| Cell SE gain | 8.7% | 2.7% | 0.1% |
| %5 SE gain | −10% | −13% | −11% |

As can be seen from table 5, compared with one subband PMI covering two consecutive subbands, sending one wideband PMI and one differential subband PMI and using precoder interpolation provides significant gains in cell throughput. Thus, extending the PUSCH based on CQI reporting for 4Tx antenna transmissions with precoder interpolation for rank one may provide a significant throughput gain for MU-MIMO transmissions. In accordance with embodiments, for the PUSCH 3-1 extension, one more wideband PMI may be fed back for 4Tx at least for rank one.

The subband CQI is calculated conditioned on the interpolated precoder using both wideband PMI.

In accordance with embodiments, for the PUSCH 3-2, for an overhead of one PMI per subband, two PMIs may be used to interpolate the precoder for two consecutive subbands and calculate the CQI for these two subbands accordingly. For an overhead of one PMI every two subbands, one wideband PMI and 2 bits differential PMI per subband may be used to interpolate the precoder for each subband and calculate the CQI for this subband conditioned on the interpolated precoder.

Figure 5A:
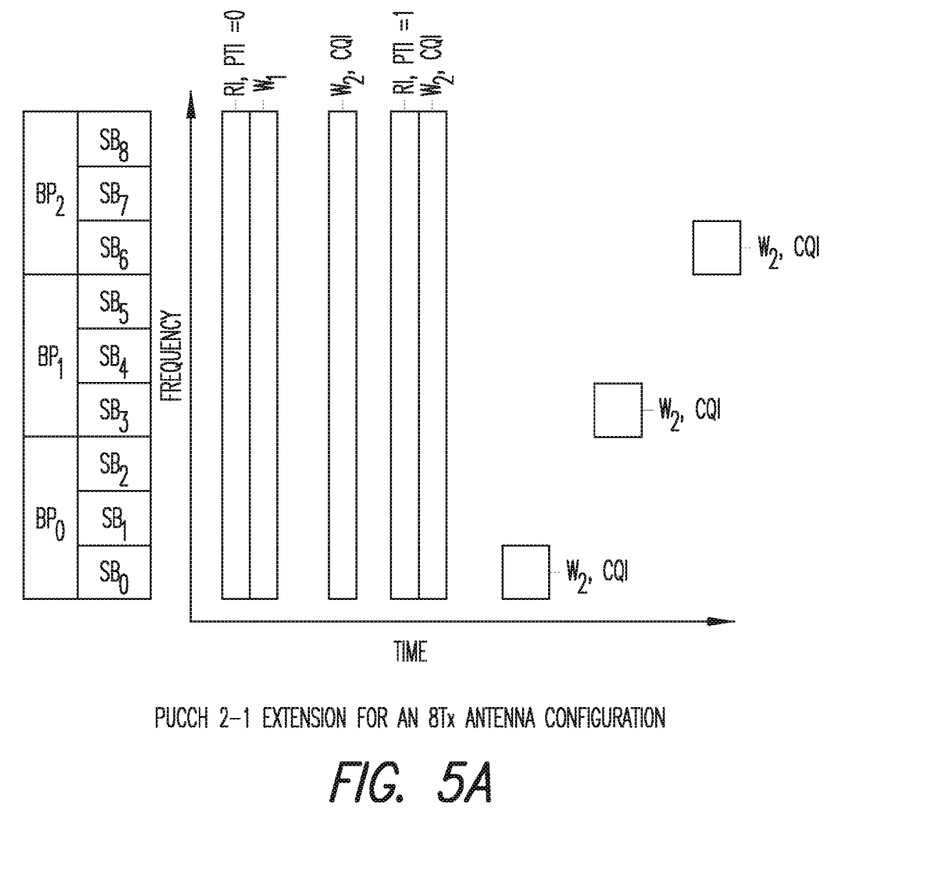
FIGS. 5A and 5B illustrate examples of transmissions on the PUCCH configured for reporting mode 2-1 extension in accordance with some embodiments.

FIGS. 5A and 5B illustrate examples of transmissions on the PUCCH 2-1 in accordance with some embodiments. FIG. 5A shows an example of the PUCCH 2-1 in which eight transmit antennas (8Tx) are used at the eNB 102 (FIG. 1). Because the 8Tx codebook in LTE-A release 10 is much larger than 4Tx codebook in LTE release 8, two PMIs may be used to represent one precoder. For rank one, the first index may be 4 bits and the second index may also be 4 bits. The two index codebook structure may result in error propagation because if the first precoding matrix ($W_1$) is in error, the subsequent precoding matrix using $W_2$ report would also be in error.

Figure 5B:
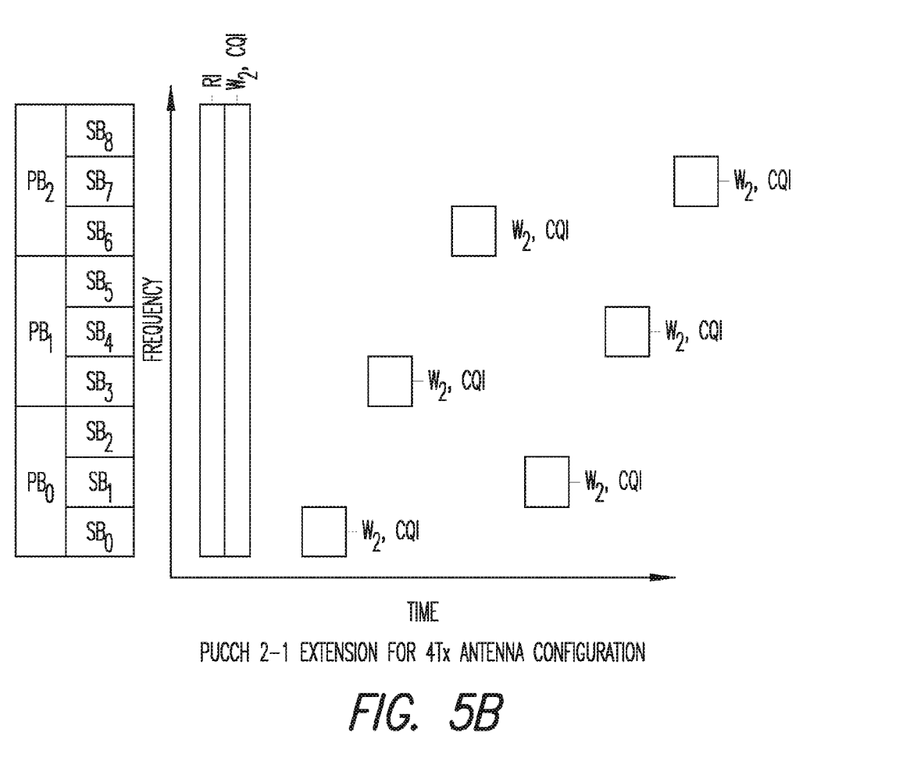

FIG. 5B shows an example of the PUCCH 2-1 in which four transmit (4Tx) antennas are used at the eNB 102. In this example, there is no payload-type identifier (PTI) bit in a 4Tx antenna transmission and thus there is no error propagation from the wideband precoding index to the subband precoder. On the other hand, in case of an 8Tx antenna transmission and a CQI report in accordance with PUCCH 2-1, the PTI bit is sent together with RI. The PTI bit determines the content of reports following the RI/PTI report, so the PTI may be in error.

Figure 6A:
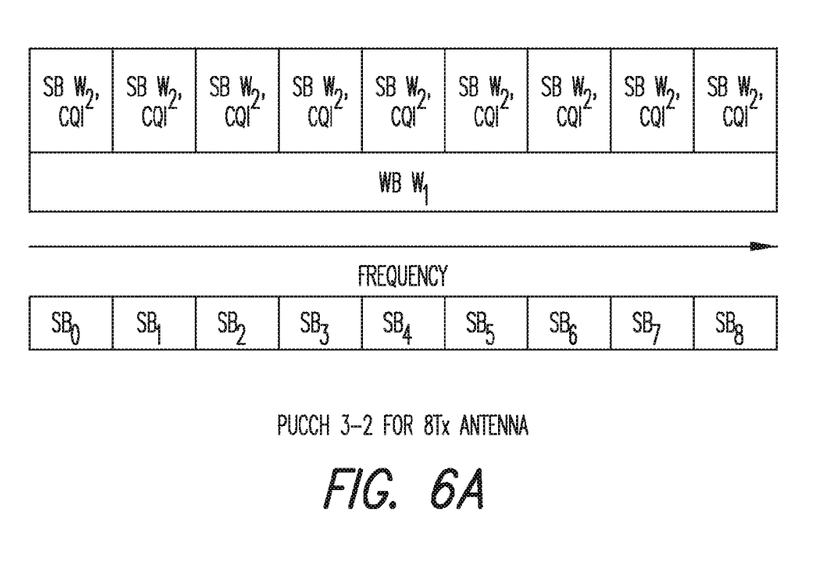
FIGS. 6A through 6G illustrate examples of transmissions on the PUCCH configured for reporting mode 3-1 in accordance with some embodiments.

FIGS. 6A-6G illustrate PMI and CQI reporting associated with the PUCCH 3-2 in accordance with embodiments. FIG. 6A illustrates an example of a PUCCH 3-2 using 8 transmit antennas at the eNB 102 (FIG. 1). Because the 8Tx codebook in LTE-A release 10 is much larger than 4Tx codebook in LTE release 8, two PMIs may be used to represent one precoder. One wideband $W_1$ PMI may be signaled and one subband $W_2$ PMI may be signaled for each subband. The subband precoder may be represented by both the wideband $W_1$ PMI and the subband $W_2$ PMI. For rank one, the wideband $W_1$ PMI may be 4 bits and subband $W_2$ PMI may also be 4 bits.

Figure 6B:
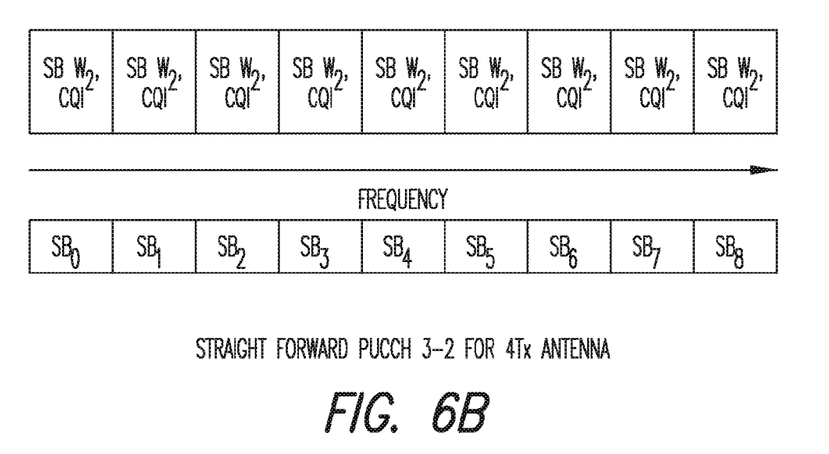

FIG. 6B illustrates an example of a straight-forward PUCCH 3-2 for 4Tx. Since there is no wideband $W_1$ PMI for 4Tx, the precoder for each subband may be represented by the subband $W_2$ PMI alone. For 4Tx, the throughput of each subband may be limited by the residual CSI quantization error from the LTE release 8 codebook. If the channel is less frequency selective, the use of a subband PMI does not improve the throughout significantly compared with the use of a subband PMI on the PUSCH 3-1.

Although the use of a larger codebook may improve throughput significantly, defining a larger codebook may not be feasible in LTE release 10 when the LTE release 8 4Tx codebooks are used. Therefore, embodiments disclosed herein that use using the release 8 codebooks to achieve a higher resolution may be particularly beneficial.

Figure 6C:
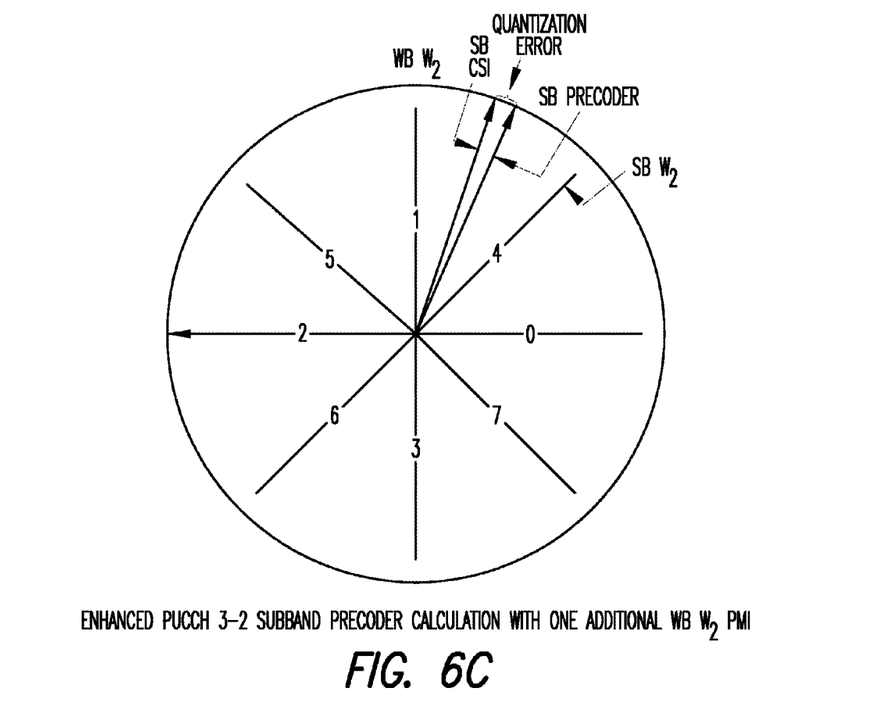
Figure 6D:
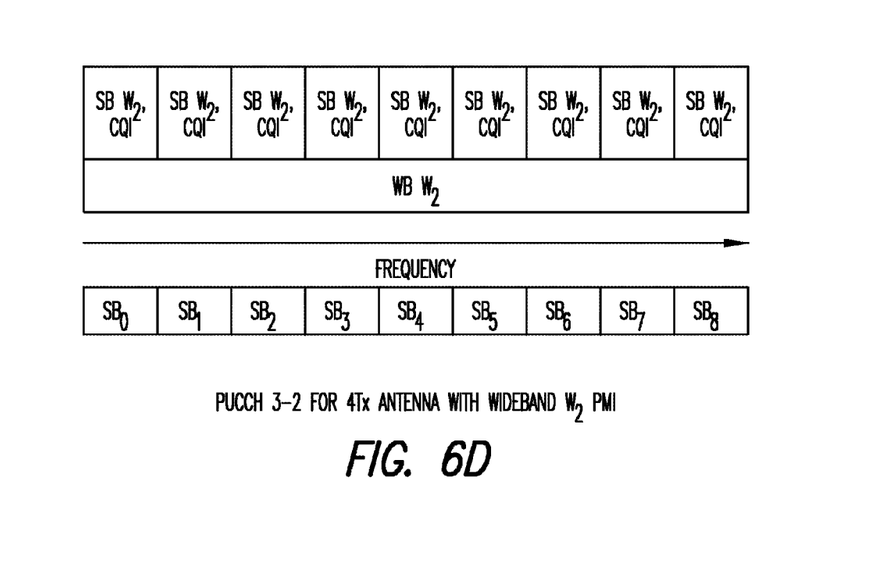
Figure 6E:
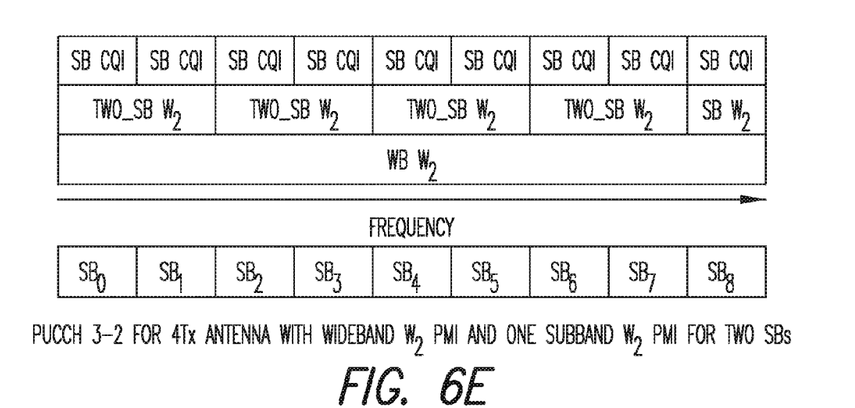

In accordance with these embodiments, a wideband $W_2$ PMI is signaled for the 4Tx PUSCH 3-2, and both the wideband $W_2$ PMI report and the subband $W_2$ PMI report may be used to calculate the precoder for each subband. The subband CQI is calculated according to the interpolated subband precoder. FIG. 6C illustrates the use of one wideband $W_2$ PMI and one subband $W_2$ PMI to generate an interpolated subband precoder. In this example the wideband $W_2$ PMI indicates DFT vector 1 and the subband $W_2$ PMI indicates DFT vector 4. FIG. 6D illustrates reporting for 4Tx PUSCH 3-2 (i.e., one wideband PMI for all subbands) in accordance with embodiments. From a size perspective, the reporting for 4Tx PUSCH 3-2 is the same as the reporting for the 8Tx report type. FIG. 6E illustrates reporting for 4Tx PUSCH 3-2 in which a subband $W_2$ PMI is reported for every two subbands along with a wideband $W_2$ PMI.

Figure 6F:
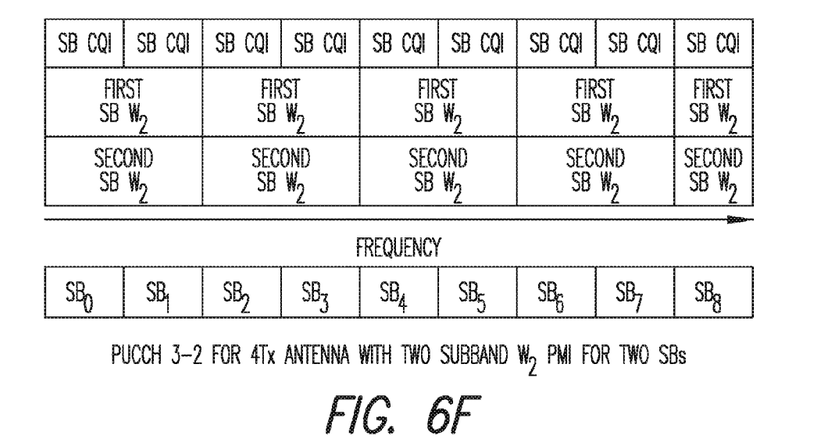

Instead of sending one wideband $W_2$ PMI and sending one subband $W_2$ PMI for each subband, some alternate embodiments include sending two $W_2$ PMIs for every two consecutive subbands. In these embodiments, the precoder for these two subbands may be interpolated by these two $W_2$ PMI reports. An example of this is illustrated in FIG. 6F.

Figure 6G:
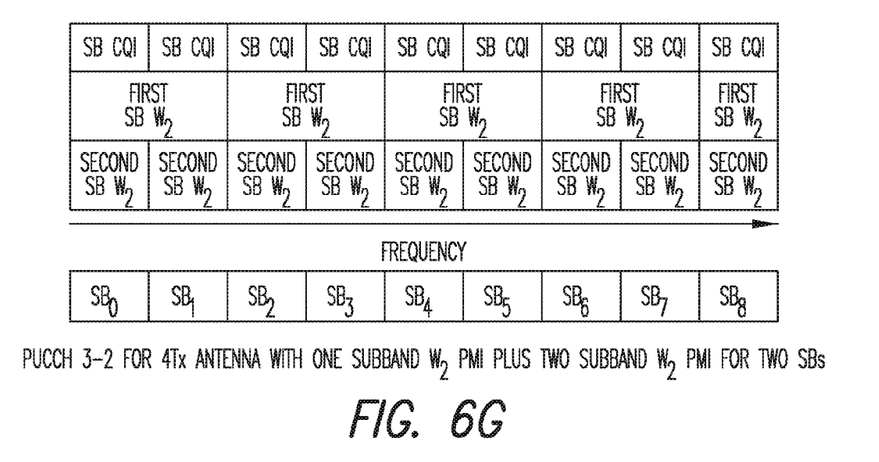

Other alternative embodiments may include sending one wideband $W_2$ PMI every N subbands and sending one subband $W_2$ PMI for every subband. In these embodiments, the precoder for each subband may be jointly interpolated from both the wideband $W_2$ PMI for this subband and the subband $W_2$ PMI for this subband. An example of this is illustrated in FIG. 6G.

In these embodiments, the subband precoder may be calculated as follows. If the wideband $W_2$ PMI is represented as i and the subband $W_2$ PMI is represented as j, then the precoder for PMI i and j are $v_i$ and $v_j$. For rank one, both $v_i$ and $v_j$ are 4 by 1 vectors. Note that if j is equal to i, then the recommended subband precoder is $v_i$.

If both $v_i$ and $v_j$ are DFT vectors, which have the forms $$v_i = \tfrac{1}{2}[1\, e^{j\theta_i} e^{j2\theta_i} e^{j3\theta_i}]^T$$

and $$v_j = \tfrac{1}{2}[1\, e^{j\theta_j} e^{j2\theta_j} e^{j3\theta_j}]^T,$$

then the recommended subband precoder may be computed as $$v_{SB} = \frac{1}{2}\left[ 1 \quad e^{j\frac{\theta_i+\mu\theta_j}{1+\mu}} \quad e^{j2\left(\frac{\theta_i+\mu\theta_j}{1+\mu}\right)} \quad e^{j3\left(\frac{\theta_i+\mu\theta_j}{1+\mu}\right)} \right]^T.$$

When any of the two precoding vectors are non-DFT vectors $$v_i = \tfrac{1}{2}[1\, e^{j\alpha_1} e^{j\alpha_2} e^{j\alpha_3}]^T \text{ and}$$

$$v_j = \tfrac{1}{2}[1\, e^{j\beta_1} e^{j\beta_2} e^{j\beta_3}]^T, \text{ then}$$

the recommended subband precoder may be computed as $$v_{SB} = \frac{1}{2}\left[ 1 \quad e^{j\frac{(\alpha_1+\mu\beta_1)}{1+\mu}} \quad e^{j\frac{(\alpha_2+\mu\beta_2)}{1+\mu}} \quad e^{j\frac{(\alpha_3+\mu\beta_3)}{1+\mu}} \right]^T$$

In these embodiments, $\mu$ is a phase scaling factor and may, for example, be either 1 or ½. The wideband and the subband precoding matrixes may be represented by $$v_i = \frac{1}{2\sqrt{2}}\begin{bmatrix} 1 & e^{j\alpha_4} \\ e^{j\alpha_1} & e^{j\alpha_5} \\ e^{j\alpha_2} & e^{j\alpha_6} \\ e^{j\alpha_3} & e^{j\alpha_7} \end{bmatrix}^T \text{ and } v_j = \frac{1}{2\sqrt{2}}\begin{bmatrix} 1 & e^{j\beta_4} \\ e^{j\beta_1} & e^{j\beta_5} \\ e^{j\beta_2} & e^{j\beta_6} \\ e^{j\beta_3} & e^{j\beta_7} \end{bmatrix}^T$$

The recommended matrix may be computed as $$v_i = \frac{1}{2\sqrt{2(1+\varepsilon^2)}} \begin{bmatrix} 1 & \varepsilon e^{\frac{j(\alpha_4+\mu\beta_4)}{2}} \\ e^{\frac{j(\alpha_1+\beta_1)}{2}} & \varepsilon e^{\frac{j(\alpha_5+\mu\beta_5)}{2}} \\ e^{\frac{j(\alpha_2+\beta_2)}{2}} & -\varepsilon e^{\frac{j(\alpha_2+\beta_2+\alpha_4+\mu\beta_4)}{2}} \\ e^{\frac{j(\alpha_3+\beta_3)}{2}} & -\varepsilon e^{\frac{j(\alpha_3+\beta_3-\alpha_2-\beta_2+\alpha_5+\mu\beta_5)}{2}} \end{bmatrix}^T$$

In these embodiments, ε may be used as a scalar between 0 and 1 for the second layer if the secondary principle Eigen value is considerably smaller than that of the principle Eigen value. In these embodiments, ε may be set to equal 1. In some embodiments, ε may be signaled by eNB 102 (FIG. 1). The signaling can be either cell-specific or UE specific. μ is the phase scaling factor for the second precoder and may have a value between 0 and 1.

In some embodiments, the subband CQI calculation may be conditioned on subband $W_2$ PMI j. The eNB 102 may adjust the subband precoder and the related subband CQI based on the subband $W_2$ PMI j and wideband $W_2$ PMI i in a purely implementation-related manner.

In these embodiments, the codebook search method for wideband $W_2$ PMI i and the subband $W_2$ PMI j may be similar to that of the LTE release 8 implementation. In these embodiments, the UE 202 (FIG. 2) may first search for a wideband $W_2$ PMI i as the best precoding vector within the original 4Tx LTE release 8 codebook in the wide band $W_2$/CQI report. The UE 202 may then search for a subband $W_2$ j within the vectors having minimum chordal distance with vector i and test if the interpolated vector results in higher codebook search metrics for the given subband in the subband $W_2$/CQI report. For example in FIG. 6C, the best wideband $W_2$ PMI i may be DFT vector 1 after searching the release 8 codebook. And after fixing wideband $W_2$ PMI i=1, the UE 202 may search three candidates for j which may be DFT vectors 1, 4 and 5. The UE 202 may then test each of the interpolated subband precoders (i.e., for j=1, j=4 and j=5) to determine which will provide the best metrics for the given subband. In this case, the UE 202 may determine that j=4 will result in the best precoder for the given subband. In these embodiments, the UE 202 may feed back the subband $W_2$ PMI j=4. The subband CQI will therefore be conditioned on the interpolated subband precoder from wideband $W_2$ PMI i=1 and subband $W_2$ PMI j=4.

In these embodiments, with the subband precoder being interpolated based on the wideband $W_2$ PMI i and the subband $W_2$ PMI j, the CSI quantization error for the given subband may be effectively halved when a highly correlated channel is considered and the speed of the UE 202 is low.

Since one subband $W_2$ PMI should be sent for each subband in PUSCH 3-2 to reduce quantization error, the subband PMI overhead reduction becomes a valid consideration. Two kinds of subband $W_2$ PMI reduction embodiments can be defined.

In a first embodiment, a 2-bits subband $W_2$ differential PMI to signal the subband $W_2$ may be defined. These 2-bits subband $W_2$ differential PMI may be sufficient to describe the top four candidates from the LTE release 8 codebook to perform subband precoder interpolation.

For 4Tx, the subband $W_2$ differential PMI may be defined using the following tables:

TABLE 6-4

4Tx Rank one Subband $W_2$ differential PMI

| | | Wideband $W_2$ PMI index | | | | | | | | | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| Subband | 0 | 0 | 1 | 2 | 3 | 4 | 5 | 6 | 7 | 8 | 9 | 10 | 11 | 12 | 13 | 14 | 15 |
| $W_2$ | 1 | 7 | 4 | 5 | 6 | 0 | 1 | 2 | 3 | 1 | 0 | 1 | 0 | 4 | 5 | 5 | 4 |
| differential | 2 | 4 | 5 | 6 | 7 | 1 | 2 | 3 | 0 | 3 | 2 | 3 | 2 | 7 | 6 | 6 | 7 |
| PMI index | 3 | 9 | 8 | 11 | 10 | 8 | 9 | 10 | 11 | 7 | 4 | 5 | 6 | 8 | 9 | 10 | 11 |

TABLE 6-5

4Tx Rank two Subband $W_2$ differential PMI

| | | Wideband $W_2$ PMI index | | | | | | | | | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| Subband | 0 | 0 | 1 | 2 | 3 | 4 | 5 | 6 | 7 | 8 | 9 | 10 | 11 | 12 | 13 | 14 | 15 |
| $W_2$ | 1 | 1 | 0 | 1 | 0 | 5 | 4 | 0 | 0 | 1 | 0 | 4 | 4 | 0 | 0 | 0 | 0 |
| differential | 2 | 3 | 2 | 3 | 2 | 10 | 10 | 9 | 9 | 3 | 2 | 5 | 5 | 1 | 1 | 1 | 1 |
| PMI index | 3 | 6 | 8 | 9 | 8 | 11 | 11 | 10 | 10 | 9 | 6 | 6 | 6 | 3 | 2 | 2 | 3 |

TABLE 6-6

4Tx Rank 3 Subband $W_2$ differential PMI

| | | Wideband $W_2$ PMI index | | | | | | | | | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| Subband | 0 | 0 | 1 | 2 | 3 | 4 | 5 | 6 | 7 | 8 | 9 | 10 | 11 | 12 | 13 | 14 | 15 |
| $W_2$ | 1 | 1 | 0 | 9 | 0 | 7 | 6 | 5 | 4 | 9 | 2 | 1 | 2 | 6 | 4 | 7 | 5 |
| differential | 2 | 3 | 10 | 11 | 10 | 1 | 1 | 0 | 2 | 11 | 8 | 3 | 8 | 5 | 7 | 4 | 6 |
| PMI index | 3 | 6 | 6 | 7 | 12 | 8 | 11 | 11 | 11 | 6 | 12 | 7 | 6 | 1 | 1 | 1 | 1 |

In a second embodiment, the granularity for each subband $W_2$ PMI may be reduced such that one subband $W_2$ will correspond to N neighboring subbands. N for example may be two. An example of this was illustrated in FIG. 6E. The precoder for two neighboring subbands may be interpolated based on the subband $W_2$ PMI for those two subbands and the wideband $W_2$ PMI.

Although the eNB 102 (FIG. 1) and the UE 202 (FIG. 2) are illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements of the eNB 102 and the UE 202 may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the eNB 102 and the UE 202 may include one or more processors and may be configured with instructions stored on a computer-readable storage device.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a User Equipment (UE) comprising:
    a memory; and
    processing circuitry in communication with the memory configured to:
        encode symbols for transmission in a physical uplink shared channel (PUSCH);
        decode configuration information for channel state information (CSI) reporting;
        configure the UE for the CSI reporting in accordance with PUSCH CSI reporting mode 3-2 (PUSCH 3-2) based on the configuration information;
        select a preferred precoding matrix for each subband of a set of subbands based on transmission in a corresponding subband,
        report one wideband channel quality indicator (CQI) value of a precoder codebook for the set of subbands in accordance with the PUSCH 3-2; and
        report a single precoding matrix indicator (PMI) for each subband, each reported single PMI being associated with the selected preferred precoding matrix for the corresponding subband in accordance with the PUSCH 3-2, the PMI for each subband being selected from a four transmit antenna (4TX) codebook stored in the memory for receipt of up to four layer multiple-input multiple output (MIMO) transmission.

2. The apparatus of claim 1 wherein the processing circuitry is further configured to:
    decode configuration information for aperiodic channel state information (CSI) reporting using the PUSCH to configure the UE for PUSCH CSI reporting mode 3-1 (PUSCH 3-1); and
    when configured for the PUSCH 3-1, the UE is configured to:
        select a single precoding matrix from the 4TX codebook for transmission on a plurality of subbands;
        report a single PMI when configured for the four layer MIMO transmission; and
        report first and second PMIs corresponding to the single precoding matrix when configured for receipt of eight layer MIMO transmission.

3. The apparatus of claim 1 wherein the processing circuitry is further configured to:
    report a subband CQI value for each subband, the reported subband CQI value reflecting transmission over a single subband using the selected preferred precoding matrix in the corresponding subband in accordance with the PUSCH 3-2, and
    wherein each of the subband CQI values is differentially encoded with respect to the wideband CQI value.

4. The apparatus of claim 3 wherein the processing circuitry is further configured to configure the UE to report two or more subband CQI values for each subband.

5. The apparatus of claim 3 wherein the processing circuitry is further configured to:
    report a rank indicator (RI) corresponding to a transmission rank; and
    calculate the single PMI for each subband and the subband CQI value for each subband based at least in part on the reported rank indicator.

6. The apparatus of claim 5 wherein the processing circuitry is further configured to decode up to the four layer MIMO transmission from an enhanced Node B (eNB),
    wherein the up to the four layer MIMO transmission is precoded in accordance with the reported PMIs.

7. The apparatus of claim 5 wherein the PMI for each subband is selected from the 4TX codebook for receipt of up to eight layer MIMO transmission, each PMI corresponding to a pair of codebook indices.

8. The apparatus of claim 7 wherein the processing circuitry is further configured to decode up to the eight layer MIMO transmission from an enhanced Node B (eNB),
    wherein the up to the eight layer MIMO transmission is precoded in accordance with the reported PMIs.

9. A non-transitory computer readable storage medium that stores instructions for execution by processing circuitry of a User Equipment (UE) to configure the UE to:
    decode configuration information for channel state information (CSI) reporting;
    configure the UE for the CSI reporting in accordance with a physical uplink shared channel (PUSCH) CSI reporting mode based on the configuration information,
    when the UE is configured for PUSCH CSI reporting mode 3-2 (PUSCH 3-2), the processing circuitry is configured to:
        select a preferred precoding matrix for each subband of a set of subbands;

report one wideband channel quality indicator (CQI) value of a precoder codebook for the set of subbands in accordance with the PUSCH 3-2; and report a single precoding matrix indicator (PMI) for each subband, each reported single PMI being associated with the selected preferred precoding matrix for the corresponding subband in accordance with the PUSCH 3-2, the PMI for each subband being selected from a four transmit antenna (4TX) codebook for receipt of up to four layer multiple-input multiple output (MIMO) transmission, and decode up to the four layer MIMO transmission from an enhanced Node B (eNB), wherein the up to the four layer MIMO transmission is precoded in accordance with the reported PMIs.

10. The non-transitory computer readable storage medium of claim 9 wherein when configured for PUSCH CSI reporting mode 3-2, the processing circuitry is further configured to:

report a subband CQI value for each subband, the reported subband CQI value reflecting transmission over a single subband using the selected preferred precoding matrix in a corresponding subband in accordance with the PUSCH 3-2.

11. The non-transitory computer readable storage medium of claim 10 wherein the processing circuitry is configured to configure the UE to report two or more of the subband CQI values for each subband when configured for the PUSCH 3-2.

12. The non-transitory computer readable storage medium of claim 10 wherein when configured for the PUSCH 3-2, the processing circuitry is further configured to:

report a rank indicator (RI) corresponding to a transmission rank; and calculate the single PMI for each subband and the subband CQI value for each subband based at least in part on the reported rank indicator.

13. The non-transitory computer readable storage medium of claim 12 wherein the PMI for each subband is selected from the four transmit antenna (4TX) codebook for receipt of up to the four layer MIMO transmission.

14. The non-transitory computer readable storage medium of claim 12 wherein the PMI for each subband is selected from the four transmit antenna (4TX) codebook for receipt of up to eight layer MIMO transmission, each PMI corresponding to a pair of codebook indices.

15. An apparatus of an enhanced Node B (eNB) comprising:

a memory; and processing circuitry in communication with the memory and configured to:

generate configuration information to user equipments (UEs) for channel state information (CSI) reporting using a physical uplink shared channel (PUSCH); and encode the configuration information for transmission to the UEs, wherein for UEs configured for reporting in accordance with PUSCH CSI reporting mode 3-2 (PUSCH 3-2), the processing circuitry is further configured to:

decode one wideband channel quality indicator (CQI) value of a precoder codebook for a set of subbands;

decode a reported single precoding matrix indicator (PMI) for each subband of the set of subbands, each reported single PMI being associated with a selected preferred precoding matrix for a corresponding subband;

decode a subband CQI value for each subband, the reported subband CQI value reflecting transmission over a single subband using the selected preferred precoding matrix in the corresponding subband; and encode up to four layer multi-user multiple-input multiple output (MU-MIMO) transmission for the UEs in accordance with the reported PMIs.

16. The apparatus of claim 15 wherein the CQIs values and PMIs are B received from the UEs on a physical uplink control channel (PUCCH), and wherein up to the four layer MU-MIMO transmission is configured for a physical downlink shared channel (PDSCH).

17. The apparatus of claim 16, wherein the PMI for each subband is associated with a four transmit antenna (4TX) codebook stored in the memory for precoding of up to the four layer MU-MIMO transmission.

18. The apparatus of claim 16 wherein the PMI for each subband is associated with a four transmit antenna (4TX) codebook for up to eight layer MU-MIMO transmission, each PMI corresponding to a pair of codebook indices.

19. The apparatus of claim 15 wherein the processing circuitry is further configured to decode a reported two or more of the subband CQI values for each subband.

* * * * *

UNITED STATES PATENT AND TRADEMARK OFFICE
CERTIFICATE OF CORRECTION

PATENT NO. : 9,843,367 B2
APPLICATION NO. : 15/373366
DATED : December 12, 2017
INVENTOR(S) : Zhu et al.

Page 1 of 1

It is certified that error appears in the above-identified patent and that said Letters Patent is hereby corrected as shown below:

In the Claims

In Column 13, Line 59, in Claim 1, delete "subband," and insert --subband;-- therefor In Column 16, Line 31, in Claim 16, after "are", delete "B"

Signed and Sealed this
Twenty-eighth Day of May, 2019

Andrei Iancu
*Director of the United States Patent and Trademark Office*